Sept. 1, 1925.
J. W. LEHR
FAUCET
Filed July 12, 1923
1,551,758
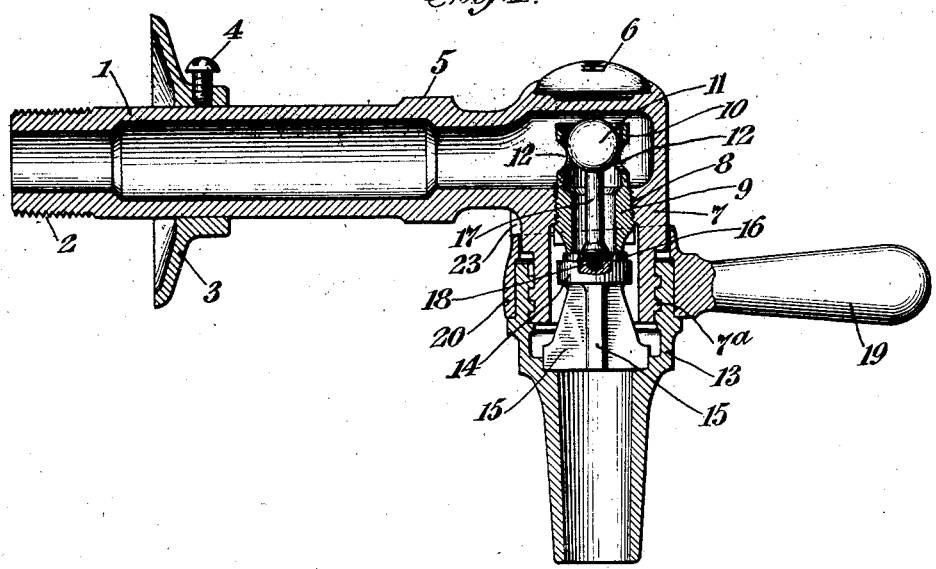
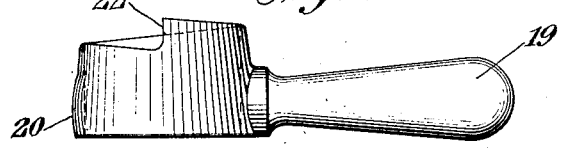
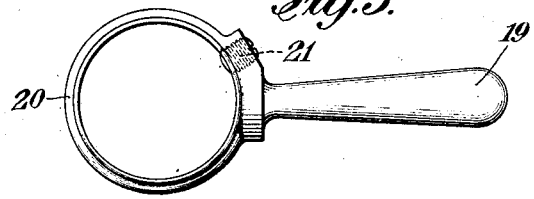

Patented Sept. 1, 1925.

1,551,758

UNITED STATES PATENT OFFICE.

JUSTUS W. LEHR, OF BALTIMORE, MARYLAND, ASSIGNOR, BY MESNE ASSIGNMENTS, TO U. S. INDUSTRIAL ALCOHOL CO., A CORPORATION OF WEST VIRGINIA.

FAUCET.

Application filed July 12, 1923. Serial No. 651,007.

*To all whom it may concern:*

Be it known that I, JUSTUS W. LEHR, a citizen of the United States, a resident of Baltimore and State of Maryland, have invented a certain new and useful Improvement in Faucets, of which the following is a specification.

My invention relates particularly to faucet constructions and is adapted for use in the manufacture of faucets for any desired purpose.

The object of my invention is to provide a faucet which may be used for controlling the flow of any desired fluid but which is especially adapted for use in water systems. The object of my invention is particularly to provide an advantageous type of construction for faucets in which the washer used for normally controlling the flow of liquid may be quickly and readily removed for repair and replacement, and the construction of which is such that the flow of water will cease when the parts have been removed for the renewal of the said washer. A further object is to provide a ball-valve for stopping the flow of liquid during the detachment of the parts for repairs, etc., which ball-valve is adapted to be inserted in the faucet in a convenient manner and in such a position that the ball-valve itself may be readily removed when necessary without the removal of or damage to the porcelain button carried on the top of the faucet for indicating whether the water supplied by the faucet is "hot" or "cold." A further object is to provide a simple type of construction of the above character. Further objects of my invention will appear from the detailed description thereof contained hereinafter.

While my invention is capable of being carried out in many different ways for the purpose of illustration I have shown only one type of faucet in the accompanying drawings, in which—

Figure 1 is a vertical section of a faucet made in accordance with my invention, Figure 2 is a side elevation of the handle operating member for opening and closing the faucet, and Figure 3 is a plan view of the handle operating member for opening and closing the faucet.

In the drawings I have shown a faucet comprising a horizontally directed pipe 1 having a screw-thread 2 at one end for attachment by means of a coupling of the usual type to a water supply pipe. This end of the pipe 1 also carries a sleeve 3 having an adjusting screw 4 so that the sleeve 3 may be moved adjacent to the wall in which the faucet is located so as to provide an ornamental finish and to close any remaining opening in the wall through which the water supply pipe passes. Near the other end of the pipe 1 there is an annular nut surface 5 to assist in tightening the faucet in place. At its outermost end the pipe 1 has a porcelain button 6 set into the top thereof for indicating whether the water supplied by the faucet is "hot" or "cold." It will be noted that this button 6 is arranged to be cemented permanently in place and that it is not necessary to remove or break the same in gaining access to the remaining parts of the faucet. At this end of the pipe there is a downwardly directed annular extension 7 which has an internal screw-thread 8 to receive an annular member 9 having a cage 10 at its upper end to retain in place a ball-valve 11. Two openings 12 are located on the opposite sides of the cage 10 to permit the passage of water through the same. At its lower end the extension 7 has a large square screw-thread $7^a$ to cooperate with a similar screw-thread upon a nozzle 13, the rotation of which controls the position of a supporting member 14 having four wings 15 which are set in corresponding recesses in the interior of the nozzle 13. The supporting member 14, at its upper portion, retains in position a washer 16 made of fibre or leather or any other desired material. The washer 16 is fastened in position by means of a rotatable stem 17 which is provided with a screw-thread 18 at its lower end screw-threaded into the interior of the supporting member 14. The washer 16 is arranged to be supported in this manner against the lower end of the annular member 9 which, in this way, acts as a valve seat. The upper end of the stem 17 serves to elevate the ball valve 11 away from its seat in the interior of the annular member 9 in the permanent operation of the faucet. The nozzle 13 is rotated by means of a handle 19 which has a sleeve 20 secured around the outside of the nozzle 13 in any desired position with the aid of a screw 21. It will be noted that the sleeve 20 has a vertical abutment 22, the position of which may be adjusted by the adjusting of the relative position between the handle 19 and the nozzle 13 with the aid of the screw 21 so that in this way the vertical abutment may act as a stop against a projection 23 on the pipe 1. The adjustment of the abutment 22 with regard to the projection 23 will be made according to the flow of water desired in the extreme open position of the faucet and this adjustment will be determined according to the pressure of the water supply and the degree of wear which has taken place in the washer 16.

In the operation of the faucet the water supply is normally cut off by the seating of the washer 16 against its valve seat. When a flow of water is desired the handle 19 will be moved so as to, in this way, remove the washer 16 away from its valve seat and the opening of the faucet can be increased until the abutment 22 reaches the projection 23 at which point the faucet is in its maximum open position. When it is desired to cut off the flow of water the handle 19 is moved in the opposite direction until the washer 16 is seated against its valve seat. During the movement of the handle 19 in this way the ball valve 11 will be continually supported away from its valve seat.

When it is desired to repair the faucet as, for example, for the purpose of replacing the washer 16, it is merely necessary to loosen the screw 21 and then to completely unscrew the nozzle 13 from the downwardly directed extension 7 on the faucet. This will remove, at the same time, the supporting member 14 and the washer 16 which is attached thereto by means of the stem 17. When these parts have been removed in this manner the ball valve 11 bcomes seated against its valve seat within the annular member 9 so as to cut off the flow of water while the repairs are being made. If the washer 16 is to be replaced the stem 17 is unscrewed and a new washer is inserted beneath the same. The parts can now be again returned to the normal position by the reverse series of operations, the screwing up of the screw 21 serving to retain the parts in their normal operating position. Should it become necessary for any reason, on some rare occasion, to remove the ball valve 11 this can be readily done when the nozzle 13 has been removed as above described by merely unscrewing the annular member 9 in a downward direction and without disturbing or requiring the breakage of the porcelain button 6 located at the top of the faucet. For this purpose it is necessary to cut off the water supply.

While I have described my invention above in detail I wish it to be understood that many changes may be made therein without departing from the spirit of the same.

I claim:

1. In a faucet the combination of a connection to any source of supply, a removable valve member and a secondary valve for cutting off the liquid supply when the first mentioned valve has been removed, said secondary valve having a supporting means provided with a valve seat and a valve cage therein.

2. In a faucet the combination of a connection to any source of supply, a removable valve member and a secondary ball valve for cutting off the liquid supply when the first mentioned valve has been removed, said secondary valve having a supporting means provided with a valve seat and a valve cage therein.

3. In a faucet, the combination of a connection to any source of supply, a removable valve member and a removable secondary valve for cutting off the liquid supply when the first-mentioned valve has been removed, said secondary valve having a supporting means screw-threaded to the interior of the faucet and removable in a downward direction, and being provided with a valve seat and a guide for the valve to prevent displacement thereof.

4. In a faucet, the combination of a connection to any source of supply, a removable valve member and a removable secondary valve for cutting off the liquid supply when the first-mentioned valve has been removed, said secondary valve having a supporting means screw-threaded to the interior of the faucet and removable in the direction of flow of the fluid, and being provided with a valve seat and a guide for the valve to prevent lateral displacement thereof.

In testimony that I claim the foregoing, I have hereunto set my hand this 5th day of July, 1923.

JUSTUS W. LEHR.